Dec. 5, 1967 M. O. FELIX 3,356,794

DEVICE FOR REDUCING NOISE IN F.M. CARRIER RECORDING

Filed May 19, 1964

Inventor
MICHAEL O. FELIX
By Robert G. Clay
Atty

United States Patent Office 3,356,794

Patented Dec. 5, 1967

3,356,794

DEVICE FOR REDUCING NOISE IN F.M. CARRIER RECORDING

Michael O. Felix, San Carlos, Calif., assignor to Ampex Corporation, Redwood City, Calif., a corporation of California Filed May 19, 1964, Ser. No. 368,515
3 Claims. (Cl. 179—100.2)

Figure 1:
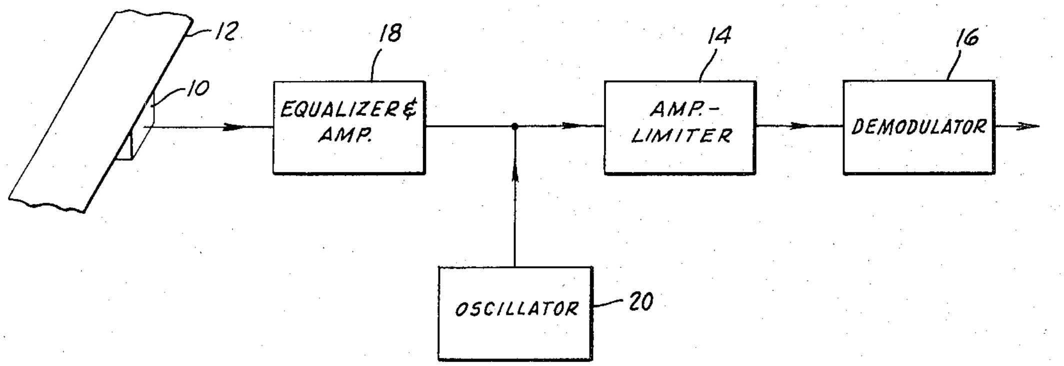

This invention relates to reproducing circuits for wide-band magnetic recorders and more particularly to a method and apparatus for reducing the effect of noise in signals produced by such circuits.

Television or other wide-band recording systems normally employ frequency modulation to record the signal on magnetic tape. In such a frequency modulation system, the modulating signal (i.e., the video or other wide-band signal) either directly modulates a multivibrator operating at the carrier frequency or modulates a high frequency oscillator which is then heterodyned to provide the signal to be recorded. The carrier frequency is slightly higher than the maximum frequency of the video or other wide-band signal, and the ratio of the change or deviation of the carrier corresponding to the maximum modulating frequency is such that the information transmitted by the frequency modulated signal is effectively contained in the carrier frequency component and the first order video upper and lower side band components.

One problem in the reproduction of such magnetically recorded frequency modulated wide-band signals is the introduction of substantial amplitude variations. Since frequency demodulators used to extract the information from such signals are also responsive to amplitude variations, the signals are rendered substantially amplitude invariant prior to demodulation by passing them through amplifying-limiting circuitry of one or more stages.

While specific amplifying-limiting circuitry may vary, most such circuitry for magnetic recorders and reproducers includes variable gain amplifiers and means for clipping off any portion of a waveform which extends beyond a preset amplitude. If the amplitude variations are substantial, as is usually the case in the reproduction of magnetically recorded wide-band signals, substantial limiting is provided. In this connection, a plurality of variable gain amplifying-limiting stages are used, thereby insuring that no peak of the waveform is of insufficient amplitude to be clipped. The resulting signal, being amplitude invariant when so limited, is demodulated to properly provide information represented by the instantaneous frequency thereof.

While in general the signal to noise ratio in the aforementioned circuitry is quite satisfactory, objectionable bursts of noise are demodulated when the signal falls off to a low, substantially non-existent level such as, for example, during dropouts, etc. Because of the variable gain characteristic of the amplifying-limiting circuitry, the low amplitude noise is amplified to an objectionably high level when such a dropout of the wide-band signal occurs. The demodulator is responsive to this amplified noise to produce bursts representative of both the frequency and amplitude variations in the noise.

Figure 2:
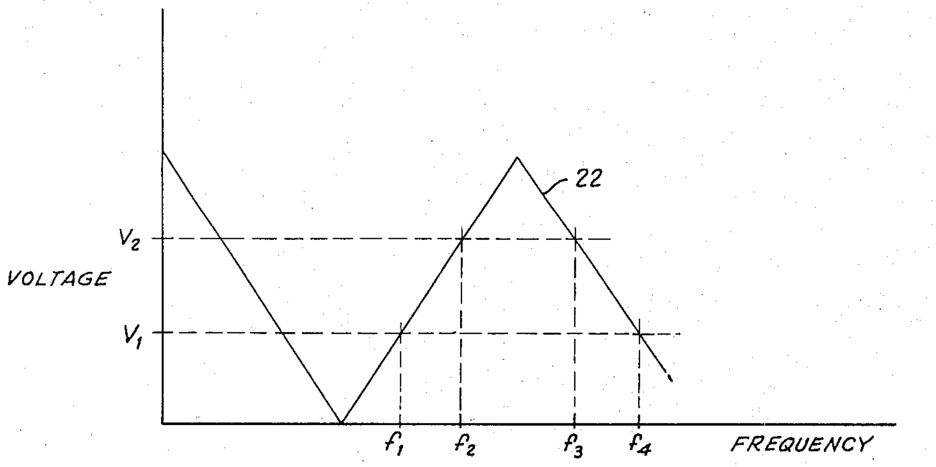

It is an object of this invention to provide a method and apparatus for reducing the effect of noise during the demodulation of frequency modulated wide-band signals reproduced from magnetic storage media. It is another object of the invention to reduce the effect of noise reproduced in a magnetically recorded frequency modulated wide-band signal system. These and other objects of the invention are particularly set forth in the following description and the accompanying drawings of which:

FIGURE 1 is a block diagram of the circuit constructed in accordance with the present invention; and FIGURE 2 is a representation of the voltage-frequency characteristic of a demodulator usable in the circuit of FIGURE 1.

In general, the illustrated circuit reduces the effect of noise bursts during the reproduction of a frequency modulated, magnetically recorded wide-band signal. The signal, reproduced by a transducer 10 from a magnetic medium 12, is demodulated to extract information therefrom after being passed through variable gain amplifying-limiting circuitry 14 which substantially eliminates amplitude variations therefrom. A separate signal of a given amplitude and frequency is coupled to a demodulator 16 through the variable gain amplifying-limiting circuitry 14. This separate signal is thus demodulated to provide a suitable substitute output for the frequency modulated signal when the level of the frequency modulated signal drops below said given amplitude.

For purposes of explanation, the illustrated circuit is described hereinafter with respect to the reproduction of magnetically recorded television signals. It is to be understood, however, that the circuit is equally applicable in the reproduction of other wide-band signals (e.g., instrumentation signals).

Referring more specifically to the drawings, frequency modulated video signals to be reproduced are recorded on magnetic tape 12 by conventional means such as an Ampex VR–1000 Videotape Recorder which includes magnetic transducer 10. The recorded signals are sensed by the magnetic transducer 10 disposed adjacent to the magnetic tape 12. The sensed waveform is amplified and equalized by circuitry 18 conventional for that purpose.

The substantial amplitude variations which are present in this sensed frequency modulated signal are eliminated by passing the waveform through the variable gain amplifying-limiting circuitry 14 which may be of conventional construction. A separate, constant amplitude signal provided by an oscillator 20 which may be any conventional oscillator capable of providing such a constant amplitude-constant frequency signal, is also coupled to the input of the variable gain amplifying-limiting circuitry 14. Preferably the amplitude of the separate signal is at least ten times the noise level and is not more than $\frac{1}{10}$ of the amplitude of the video signal. The gain of the amplifying-limiting circuitry 14 varies in response to variations in the level of the signal applied to its input. As the level of the signal increases, the gain of the circuitry decreases and as the strength of the signal decreases, the gain of the cricuitry rises correspondingly.

The gain of the amplifying-limiting circuitry 14 is controlled by the level of whichever input signal has the largest amplitude at any time. Thus, when the video signal is present, the gain of circuitry 14 is sufficiently low so that the signal provided by oscillator 20 is not amplified to any objectionable degree. When the video signal falls below the level of the signal provided by oscillator 20, however, the gain of the amplifying-limiting circuitry 14 becomes high enough to amplify the separate signal sufficiently to allow the demodultaor 16 to provide an output representative of the frequency of the separate signal. Because the level of the separate signal is very low, its presence is only noticeable in the output of the demodulator 16 when the video signal drops out, i.e., when its amplitude becomes so low and its signal-to-noise so poor as to be useless.

The signal provided at the output of limiting-amplifying circuitry 14 is demodulated by demodulator 16 to provide appropriate video information. The frequency of the separate signal is advantageously selected so that any interference caused by its presence simultaneously with the video signal may be substantially reduced. The frequency deviation of the video signal to be demodulated normally varies from a frequency $f_1$ to a frequency $f_2$. In a demodulator having a "folded" voltage-frequency characteristic 22 as shown in FIGURE 2, a signal with these frequency variations produces, when demodulated, outputs having amplitude variations ranging from $V_1$ to $V_2$. Such outputs, when applied to a video output transducer (e.g., a television set), produce video representations ranging from black when at $V_1$ to white when at $V_2$.

Under these circlumstances, the frequency of the separate signal is selected to be within the frequency range $f_3$ to $f_4$. The resulting output, produced when this signal is sufficiently amplified as explained hereinabove, also ranges between the levels $V_1$ and $V_2$ usually resulting in a gray video representation. Additionally, the selection of a frequency between $f_3$ and $f_4$ also results in the production of a beat signal between the video signal and the separate signal that can be suitably removed, for example, by a low pass filter following the demodulator.

While the above operation has been described in connection with demodulators having the characteristic shown in FIGURE 2, the desired result may also be obtained when demodulators having different characteristics (e.g., slope detectors) are utilized. In such circuits the frequency of the separate signal is selected to be close to that of the video signal so that it will produce when suitably amplified the desired video output. In such systems, it is possible that the generated beat signals, being within the video frequency range, may not be removed by filtering. It is likely, however, that they are only objectionable when the video signal has dropped to a sufficiently low level that noise within the system would be more objectionable.

In one preferred embodiment, the normal level of the frequency modulated signal at the input of the amplifying limiting-circuitry is 1.0 v. and its center frequency is approximately 6 mc. The level of noise present at that point in the circuit is about 10 mv. The signal provided by the separate oscillator has an amplitude of approximately 0.1 v. and a frequency of about 18 mc.

There has been provided, therefore, the method and apparatus for reducing the effect of noise bursts during the demodulation of the magnetically recorded frequency modulated signal when the signal drops out to a substantially non-existent level. Not only is the effect of the noise lessened, but the video output provided during the dropout may be set to whatever level is least objectionable in any given application.

Various other changes and modifications may be made in the above described method and apparatus for reducing the effect of noise in the reproduction of a magnetically recorded frequency modulated wide-band signal without deviating from the spirit and scope of the present invention.

Various of the features of the invention are set forth in the following claims.

What is claimed is:

1. A circuit for reducing the effect of noise during the reproduction of information from a magnetically recorded frequency modulated wide-band signal comprising, means providing a separate signal of given frequency and having a first amplitude substantially greater than the level of the noise, means providing a reproduced frequency modulated wide-band signal having a second amplitude substantially greater than said first amplitude, which signal is subject to reduction in amplitude below said first amplitude, variable gain means coupled to both said signal providing means for amplifying said signals, said variable gain means being responsive to the amplitude of the signal applied thereto so that the amplification of said separate signal is increased when said frequency modulated signal falls below said first amplitude, and means coupled to the output of said variable gain means for producing information represented by the frequency of the signal applied thereto.

2. A circuit for reducing the effect of noise during the reproduction of information from a magnetically recorded frequency modulated wide-band signal comprising, means providing a separate signal of given frequency and having a first amplitude substantially greater than the level of the noise, means sensing the recorded signal and providing a frequency modulated wide-band signal having a second amplitude substantially greater than said first amplitude, which signal is subject to reduction in amplitude below said first amplitude, variable gain means coupled to both said signal providing means for amplifying said signals and for eliminating amplitude variations therefrom, said variable gain means being responsive to said frequency modulated signal having said second amplitude for amplifying said signals a first amount, said variable gain means responsive to said separate signal having said first amplitude when said frequency modulated signal falls below said first amplitude for amplifying said signals a second amount greater than said first amount, and means coupled to the output of said variable gain means for producing information represented by the instantaneous frequency of said frequency modulated signal when amplified said first amount and for producing information represented by the frequency of said separate signal when amplified said second greater amount.

3. A circuit for reducing the effect of noise during the reproduction of information from a magnetically recorded frequency modulated video signal comprising, oscillator means providing a separate signal of given frequency and having a first amplitude substantially greater than the level of the noise, magnetic transducing means sensing the recorded signal and providing a frequency modulated video signal having a second amplitude substantially greater than said first amplitude, which signal is subject to reduction in amplitude below said first amplitude, variable gain amplifying-limiting means coupled to both said signal providing means for amplifying said signals and for eliminating amplitude variations therefrom, said variable gain amplifying-limiting means being responsive to said frequency modulated signal having said second amplitude for amplifying said signals a first amount, said variable gain amplifying-limiting means being responsive to said separate signal having said first amplitude when said frequency modulated signal falls below said first amplitude for amplifying said signals a second amount greater than said first amount, and demodulating means coupled to the output of said variable gain amplifying-limiting means for producing information represented by the instantaneous frequency of said frequency modulated signal when amplified said first amount and for producing information represented by the frequency of said separate signal when amplified said second greater amount.

References Cited

UNITED STATES PATENTS 2,816,162 12/1957 Johnson ---------- 179—100.2

OTHER REFERENCES

R.C.A. Technical Note No. 240. R.C.A. Laboratories, Princeton, N.J. Received in Scientific Library January 1959.

BERNARD KONICK, *Primary Examiner*.

J. R. GOUDEAU, *Assistant Examiner*.